United States Patent
Ohashi

Patent Number: 5,717,523
Date of Patent: Feb. 10, 1998

[54] UNPOLARIZED LIGHT BEAM SPLITTER

[75] Inventor: Yuichi Ohashi, Atsugi, Japan

[73] Assignee: Sokkia Co., Ltd., Tokyo, Japan

[21] Appl. No.: 741,930

[22] Filed: Oct. 31, 1996

[30] Foreign Application Priority Data

Dec. 28, 1995 [JP] Japan ................................ 7-342365

[51] Int. Cl.$^6$ ................................................ G02B 1/10
[52] U.S. Cl. ........................................ 359/588; 359/634
[58] Field of Search ................................ 359/580, 583, 359/586, 588, 589, 634

[56] References Cited

U.S. PATENT DOCUMENTS

| | | | |
|---|---|---|---|
| 4,373,782 | 2/1983 | Thelen | 359/583 |
| 5,296,961 | 3/1994 | Trost et al. | 359/583 |
| 5,400,179 | 3/1995 | Ito | 359/583 |
| 5,453,859 | 9/1995 | Sannohe et al. | 359/583 |
| 5,502,595 | 3/1996 | Kuo et al. | 359/586 |
| 5,625,492 | 4/1997 | Gunkel et al. | 359/586 |

Primary Examiner—David C. Nelms
Assistant Examiner—Thomas Robbins
Attorney, Agent, or Firm—Nikaido, Marmelstein, Murray & Oram LLP

[57] ABSTRACT

Four kinds of dielectrics in the form of a mixture of $ZrO_2$ and $TiO_2$ having a refractive index of 2.07, $MgF_2$ having a refractive index of 1.37, $Al_2O_3$ having a refractive index of 1.61, and $TiO_2$ having a refractive index of 2.27 are laminated on a transparent glass substrate in twenty layers. Two kinds of unpolarized light beam splitters having ratios of the reflected light to the transmitted light of 7:3 and 8:2, respectively, are thereby obtained. Both kinds of unpolarized light beam splitters have the twentieth layer, that is the outermost layer, formed with $MgF_2$. The difference between the reflectance of the polarizing P component and the reflectance of the polarizing S component of the reflected light is set to be below 10%.

5 Claims, 3 Drawing Sheets

UNPOLARIZED LIGHT BEAM SPLITTER

BACKGROUND OF THE INVENTION

1. Field of the Invention

The present invention relates to an unpolarized light beam splitter which separates incident light into two directions by reflecting part of it and by transmitting part of it, and in which the ratio of P component to S component, both being the polarizing components, is approximately equal in both the directions of the separated light.

2. Description of the Related Art

In a laser planer (i.e., a horizontal plane finding device using a laser beam) as shown in FIG. 5, when a laser beam (or laser radiation) L emitted from a laser diode 2 is totally reflected by a mirror (or a pentagonal prism) 4 which is mounted on a disk 3 held by a main body 1 of the horizontal plane finding device so as to be horizontally rotatable, the reflected light L1 is irradiated to rotate in the horizontal direction. If the laser beam L can be separated into horizontal reflected light L1 and vertical transmitted light L2, a plumb point (or a vertical point) can advantageously be marked on a ceiling surface without using a plumb. It is therefore considered to replace the mirror 4 with a beam splitter that can separate the laser beam into the reflected light L1 and the transmitted light L2. However, the laser diode 2 itself does not rotate and the laser beam L is unbalanced in the polarizing components. It follows that, by simply replacing the mirror 4 with a polarized light beam splitter that separates the laser beam into the P component and the S component, the reflected light L1 may vary in brightness at every change in the phase of 90 degrees. Depending on the phase, the quantity of light may thus be so insufficient that a datum plane cannot be marked. Further, the transmitted light L2 looks flickering and, depending on the phase of the beam splitter, the vertical point can neither be marked. Therefore, the mirror 4 of the horizontal plane finding device must be replaced with an unpolarized light beam splitter.

By the way, as a conventional unpolarized light beam splitter, there is known one in which a very thin Au film is formed by deposition on a transparent glass substrate.

However, the Au film absorbs laser beam and is, therefore, large in loss in quantity of light. Further, since the Au film is very soft, is easily subject to scratching, and is poor in weather proofing, it is difficult of being used in a horizontal plane finding device. In case it is used in a horizontal plane finding device, the ratio of quantity of light of the rotating reflected light L1 to that of the stationary transmitted light L2 is said to be preferably about 7:3 through 8:2. However, with the unpolarized light beam splitter having a deposited Au film therein, it is difficult to separate the light beam into such a ratio of quantity of light.

SUMMARY OF THE INVENTION

The present invention therefore has an object of providing an unpolarized light beam splitter which is superior in weather resistivity and in which the light beam can be separated into a ratio of quantity of light of about 7:3 through 8:2.

In order to attain the above and other objects, according to the present invention, there is provided an unpolarized light beam splitter having a plurality of dielectric layers with different refractive indices of first through twentieth layers which are integrally formed in sequence on a transparent optical glass substrate for dividing a laser beam having a wavelength of $\lambda$ into reflected light and transmitted light at a predetermined ratio. The unpolarized light beam splitter comprises: a first layer formed into a film thickness of $\lambda/2$ with a mixture of $ZrO_2$ and $TiO_2$ whose refractive index is 2.07; second, eighth and tenth layers each formed into a film thickness of $\lambda/4$ with $MgF_2$ whose refractive index is 1.37; third, fifth, seventh, ninth, eleventh, thirteenth, fifteenth, seventeenth and nineteenth layers each formed into a film thickness of $\lambda/4$ with $Al_2O_3$ whose refractive index is 1.61; fourth and sixth layers each formed into a film thickness of $\lambda/4$ with said mixture of $ZrO_2$ and $TiO_2$; twelfth, fourteenth, sixteenth and eighteenth layers each formed into a film thickness of $\lambda/4$ with $TiO_2$ whose refractive index is 2.27; and twentieth layer, that is an outermost layer, formed into a film thickness of $\lambda/(1.9$ through $2.4)$ with the above-mentioned $MgF_2$. The ratio of the reflected light to the transmitted light is 7:3.

According to the present invention, there is also provided an unpolarized light beam splitter having a plurality of dielectric layers with different refractive indices of first through twentieth layers which are integrally formed in sequence on a transparent optical glass substrate for dividing a laser beam having a wavelength of $\lambda$ into reflected light and transmitted light at a predetermined ratio. The unpolarized light beam splitter comprises: a first layer formed into a film thickness of $\lambda/2$ with a mixture of $ZrO_2$ and $TiO_2$ whose refractive index is 2.07; second, eighth and tenth layers each formed into a film thickness of $\lambda/4$ with $MgF_2$ whose refractive index is 1.37; third, fifth, seventh, ninth, eleventh, thirteenth, fifteenth, seventeenth and nineteenth layers each formed into a film thickness of $\lambda/4$ with $Al_2O_3$ whose refractive index is 1.61; fourth, sixth, twelfth, fourteenth, sixteenth and eighteenth layers each formed into a film thickness of $\lambda/4$ with $TiO_2$ whose refractive index is 2.27; and twentieth layer, which is an outermost layer, formed into a film thickness of $\lambda/(1.85$ through $2.45)$ with the above-mentioned $MgF_2$. The ratio of the reflected light to the transmitted light is 8:2.

As the laser beam, a visible light laser having a wavelength of $\lambda=630$ nm can be used, and the unpolarized light beam splitter is used as a reflecting mirror of a horizontal plane finding device.

Four kinds of dielectrics in the form of a mixture of $ZrO_2$ and $TiO_2$ having a refractive index of 2.07, $MgF_2$ having a refractive index of 1.37, $Al_2O_3$ having a refractive index of 1.61, and $TiO_2$ having a refractive index of 2.27 were laminated on the transparent glass substrate in twenty layers to thereby obtain two kinds of unpolarized light beam splitters having ratios of the reflected light to the transmitted light of 7:3 and 8:2, respectively. Both kinds of unpolarized light beam splitters have the twentieth layer, that is an outermost layer, formed with $MgF_2$. By varying the film thickness of the twentieth layer, the ratio of the P component to the S component, which are polarizing components contained in the reflected light, varies. In order for the beam splitter of the present invention to be an unpolarized light beam splitter, the difference between the reflectance of the P component and the reflectance of the S component need be within 10%. The unpolarized light beam splitter of the present invention was developed particularly for use in a horizontal plane finding device. In the horizontal plane finding device, a visible light laser having a wavelength of $\lambda=630$ nm is used. Therefore, the first through the twentieth layers in the embodiments to be explained hereinbelow are all set to $\lambda=630$ nm. The mixture of $ZrO_2$ and $TiO_2$ was used from a commercially available product known by the trade name of "OPTRON OH5."

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF PREFERRED EMBODIMENTS

FIRST EXAMPLE

An explanation will now be made about an unpolarized light beam splitter in which the ratio of the reflected light to the transmitted light is 7:3. In this example, the first layer through the twentieth layer were laminated with the following compositions and film thicknesses.

| Layer | Composition | Film thickness |
|---|---|---|
| 1st layer | Mixture of $ZrO_2$ and $TiO_2$ | $\lambda/2$ |
| 2nd layer | $MgF_2$ | $\lambda/4$ |
| 3rd layer | $Al_2O_3$ | $\lambda/4$ |
| 4th layer | Mixture of $ZrO_2$ and $TiO_2$ | $\lambda/4$ |
| 5th layer | $Al_2O_3$ | $\lambda/4$ |
| 6th layer | Mixture of $ZrO_2$ and $TiO_2$ | $\lambda/4$ |
| 7th layer | $Al_2O_3$ | $\lambda/4$ |
| 8th layer | $MgF_2$ | $\lambda/4$ |
| 9th layer | $Al_2O_3$ | $\lambda/4$ |
| 10th layer | $MgF_2$ | $\lambda/4$ |
| 11th layer | $Al_2O_3$ | $\lambda/4$ |
| 12th layer | $TiO_2$ | $\lambda/4$ |
| 13th layer | $Al_2O_3$ | $\lambda/4$ |
| 14th layer | $TiO_2$ | $\lambda/4$ |
| 15th layer | $Al_2O_3$ | $\lambda/4$ |
| 16th layer | $TiO_2$ | $\lambda/4$ |
| 17th layer | $Al_2O_3$ | $\lambda/4$ |
| 18th layer | $TiO_2$ | $\lambda/4$ |
| 19th layer | $Al_2O_3$ | $\lambda/4$ |
| 20th layer | $MgF_2$ | $\lambda/n$ |

Figure 1:
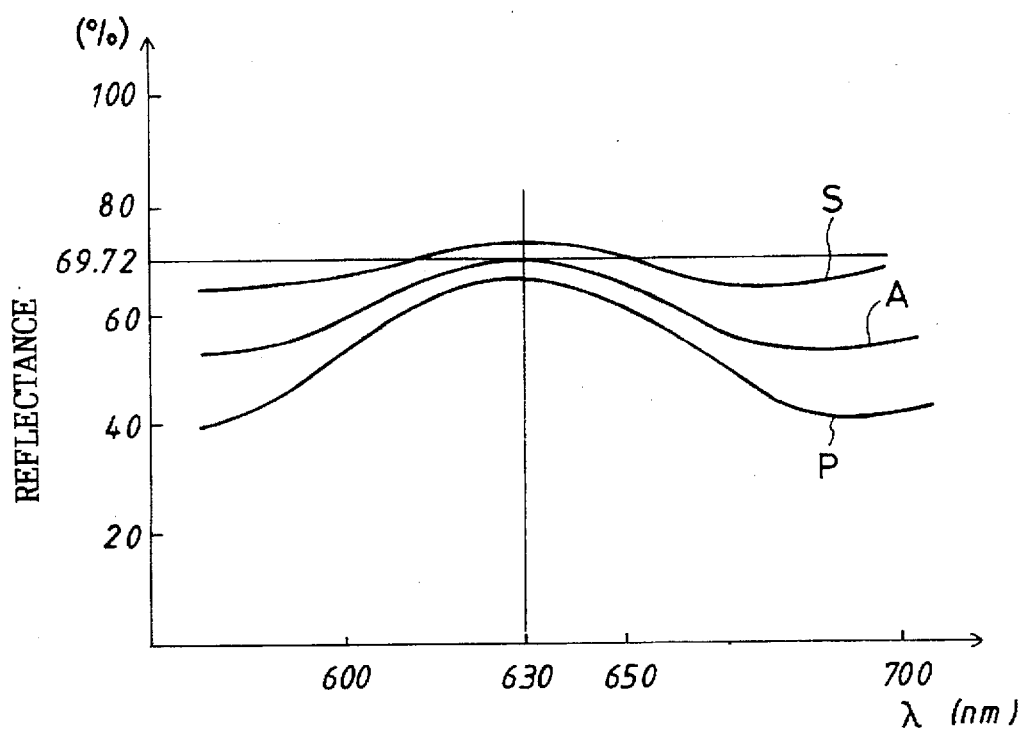
FIG. 1 is a diagram showing the relationship between the wavelength λ and the reflectance in Example 1.

Here, the reflectance of the beam splitter made by making the value n in the film thickness λ/n of the 20th layer to be n=2.08 is shown in FIG. 1. In the Figure, letters S and P denote the reflectances of the S component and the P component, respectively, of the polarizing components and letter A denotes an average reflectance including both the polarized light components. As described above, it can be seen that, since the film thickness of each of the layers is determined to be λ=630 nm, the farther λ is away from 630 nm, the lower each of the reflectances becomes and the larger the difference between the reflectance of the S component and the reflectance of the P component becomes. By the way, an average reflectance at λ=630 nm is 69.72% and the ratio of the reflected light to the transmitted light is about 7:3. Further, at λ=630 nm the difference between the reflectance of the S component and the reflectance of the P component is as low as 6.43%, and there is no problem for practical purposes as an unpolarized light beam splitter.

Figure 2:
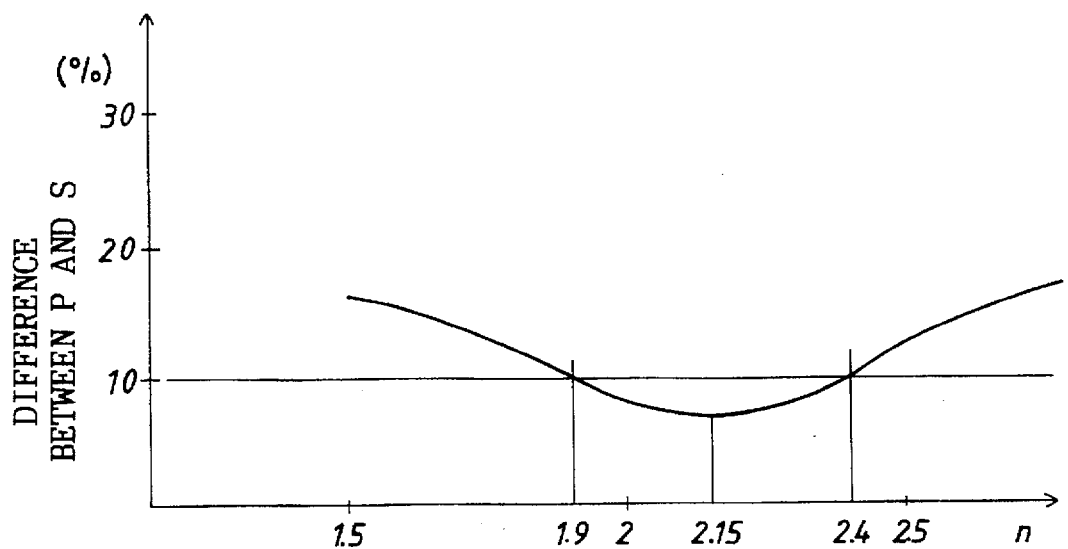
FIG. 2 is a diagram showing the relationship between the film thickness of the twentieth layer and the ratio of the polarizing components contained in the reflected light in Example 1.

Next, when the value of n which defines the film thickness of the 20th layer is sequentially varied, the difference between the reflectance of the S component and the reflectance of the P component varies, though the average reflectance does not vary. As shown in FIG. 2, it can be seen that, in order for the difference between the reflectances of both the components to be 10% or smaller, n must be 1.9 through 2.4. By the way, when n is set to be about 2.15, the difference between the reflectances of both the components can advantageously be reduced to the maximum extent possible.

SECOND EXAMPLE

As a second example, an explanation will be made about an unpolarized light beam splitter in which the ratio of the reflected light to the transmitted light is 8:2. In this example, the first layer through the twentieth layer were laminated with the following compositions and film thicknesses.

| Layer | Composition | Film thickness |
|---|---|---|
| 1st layer | Mixture of $ZrO_2$ and $TiO_2$ | $\lambda/2$ |
| 2nd layer | $MgF_2$ | $\lambda/4$ |
| 3rd layer | $Al_2O_3$ | $\lambda/4$ |
| 4th layer | $TiO_2$ | $\lambda/4$ |
| 5th layer | $Al_2O_3$ | $\lambda/4$ |
| 6th layer | $TiO_2$ | $\lambda/4$ |
| 7th layer | $Al_2O_3$ | $\lambda/4$ |
| 8th layer | $MgF_2$ | $\lambda/4$ |
| 9th layer | $Al_2O_3$ | $\lambda/4$ |
| 10th layer | $MgF_2$ | $\lambda/4$ |
| 11th layer | $Al_2O_3$ | $\lambda/4$ |
| 12th layer | $TiO_2$ | $\lambda/4$ |
| 13th layer | $Al_2O_3$ | $\lambda/4$ |
| 14th layer | $TiO_2$ | $\lambda/4$ |
| 15th layer | $Al_2O_3$ | $\lambda/4$ |
| 16th layer | $TiO_2$ | $\lambda/4$ |
| 17th layer | $Al_2O_3$ | $\lambda/4$ |
| 18th layer | $TiO_2$ | $\lambda/4$ |
| 19th layer | $Al_2O_3$ | $\lambda/4$ |
| 20th layer | $MgF_2$ | $\lambda/n$ |

As compared with the first example, the second example is different from the first example in that the compositions of the 4th and the 6th layers were changed from the mixture of $ZrO_2$ and $TiO_2$ to $TiO_2$.

Figure 3:
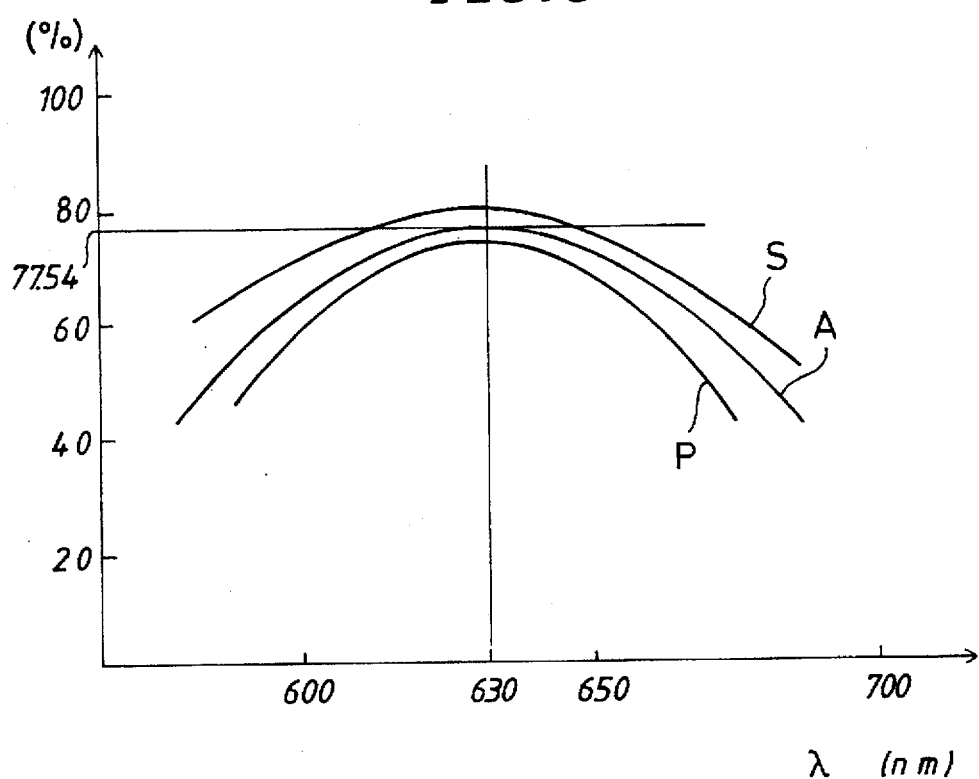
FIG. 3 is a diagram showing the relationship between the wavelength λ and the reflectance in Example 2.

Here, the reflectance of the beam splitter made by making the value n in the film thickness λ/n of the 20th layer to be n=2.08 is shown in FIG. 3. Like in the first example, it can be seen that, since the film thickness of each of the layers is determined to be λ=630 nm, the farther λ is away from 630 nm, the lower each of the reflectances becomes and the larger the difference between the reflectance of the S component and the reflectance of the P component becomes. By the way, an average reflectance at λ=630 nm is 77.54% and the ratio of the reflected light to the transmitted light is about 8:2. Further, at λ=630 nm the difference between the reflectance of the S component and the reflectance of the P component is as low as 6.6%, and there is no problem for practical purposes as an unpolarized light beam splitter.

Figure 4:
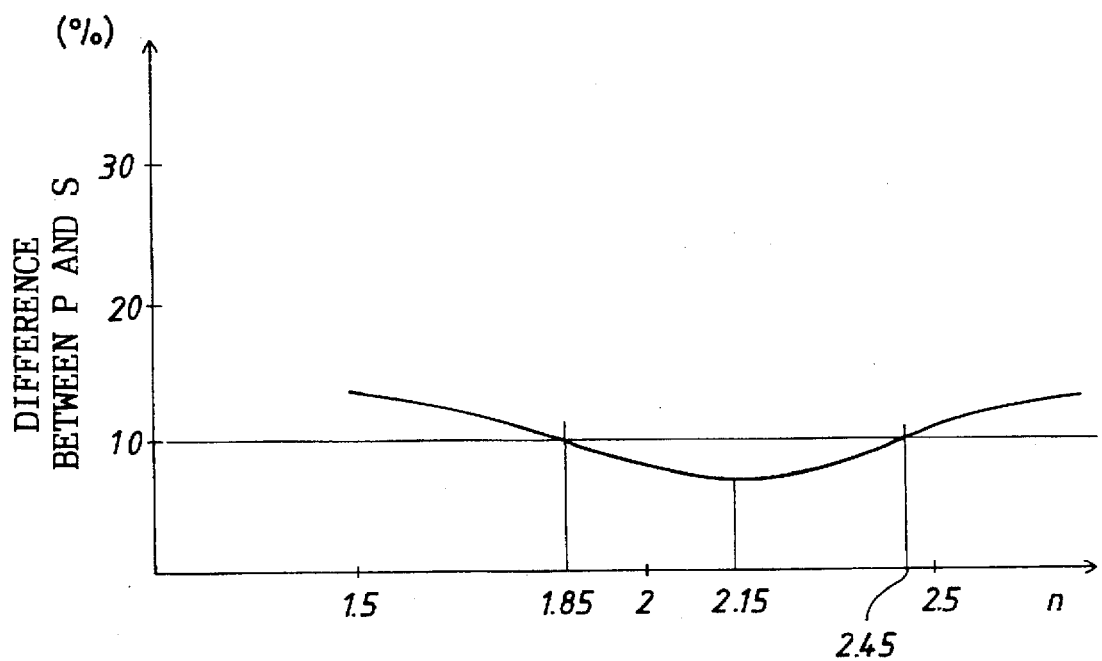
FIG. 4 is a diagram showing the relationship between the film thickness of the twentieth layer and the ratio of the polarizing components contained in the reflected light in Example 2.
Figure 5:
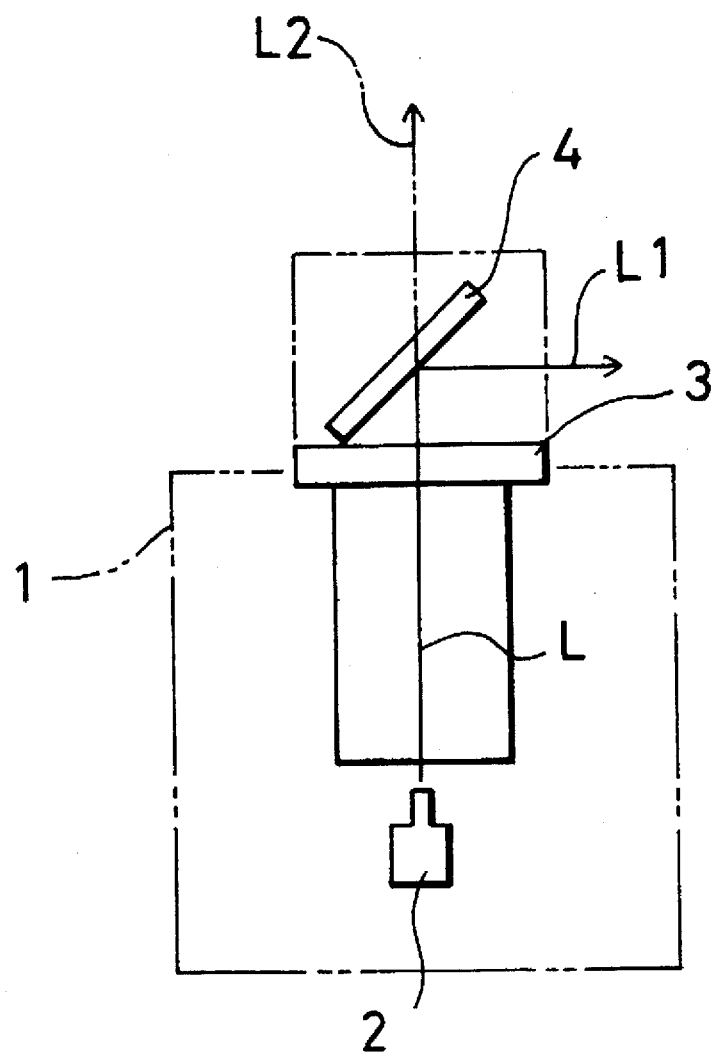
FIG. 5 is a schematic diagram showing the principle of a horizontal plane finding device to which the unpolarized beam splitter of the present invention is applied.

Next, when the value of n which defines the film thickness of the 20th layer is sequentially varied in the same manner as in Example 1, the difference between the reflectance of the S component and the reflectance of the P component varies, though the average reflectance does not vary. As shown in FIG. 4, it can be seen that, in order for the difference between the reflectances of both the components to be 10% or smaller, n must be 1.85 through 2.45. By the way, like in the first example, when n is set to be about 2.15, the difference between the reflectances of both the components can advantageously be reduced to the maximum extent possible.

As explained hereinabove, according to the present invention, the films of the dielectric layers are superior in weather resistivity as compared with a beam splitter in which an Au film is deposited. Therefore, it can be used in a measuring device such as a horizontal plane finding device. The ratio of the reflected light to the transmitted light becomes 7:3 or 8:2, and an unpolarized beam splitter which is suitable for the horizontal plane finding device can be provided.

It is readily apparent that the above-described unpolarized light beam splitter meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. An unpolarized light beam splitter having a plurality of dielectric layers with different refractive indices of first through twentieth layers which are integrally formed in sequence on a transparent optical glass substrate for dividing a laser beam having a wavelength of $\lambda$ into reflected light and transmitted light at a predetermined ratio, comprising:

a first layer formed into a film thickness of $\lambda/2$ with a mixture of $ZrO_2$ and $TiO_2$ whose refractive index is 2.07;

second, eighth and tenth layers each formed into a film thickness of $\lambda/4$ with $MgF_2$ whose refractive index is 1.37;

third, fifth, seventh, ninth, eleventh, thirteenth, fifteenth, seventeenth and nineteenth layers each formed into a film thickness of $\lambda/4$ with $Al_2O_3$ whose refractive index is 1.61;

fourth and sixth layers each formed into a film thickness of $\lambda/4$ with said mixture of $ZrO_2$ and $TiO_2$;

twelfth, fourteenth, sixteenth and eighteenth layers each formed into a film thickness of $\lambda/4$ with $TiO_2$ whose refractive index is 2.27; and twentieth layer, that is an outermost layer, formed into a film thickness of $\lambda/(1.9$ through $2.4)$ with said $MgF_2$;

wherein the ratio of the reflected light to the transmitted light is 7:3.

2. An unpolarized light beam splitter according to claim 1, wherein the laser beam is a visible light laser having a wavelength of $\lambda=630$ nm.

3. An unpolarized light beam splitter having a plurality of dielectric layers with different refractive indices of first through twentieth layers which are integrally formed in sequence on a transparent optical glass substrate for dividing a laser beam having a wavelength of $\lambda$ into reflected light and transmitted light at a predetermined ratio, comprising:

a first layer formed into a film thickness of $\lambda/2$ with a mixture of $ZrO_2$ and $TiO_2$ whose refractive index is 2.07;

second, eighth and tenth layers each formed into a film thickness of $\lambda/4$ with $MgF_2$ whose refractive index is 1.37;

third, fifth, seventh, ninth, eleventh, thirteenth, fifteenth, seventeenth and nineteenth layers each formed into a film thickness of $\lambda/4$ with $Al_2O_3$ whose refractive index is 1.61;

fourth, sixth, twelfth, fourteenth, sixteenth and eighteenth layers each formed into a film thickness of $\lambda/4$ with $TiO_2$ whose refractive index is 2.27; and twentieth layer, that is an outermost layer, formed into a film thickness of $\lambda/(1.85$ through $2.45)$ with said $MgF_2$;

wherein the ratio of the reflected light to the transmitted light is 8:2.

4. An unpolarized light beam splitter according to claim 3, wherein the laser beam is a visible light laser having a wavelength of $\lambda=630$ nm.

5. An unpolarized light beam splitter according to any one of claims 1 through 4, wherein the unpolarized beam splitter is used as a reflecting mirror of a horizontal plane finding device.

* * * * *